United States Patent
Kumar et al.

(10) Patent No.: US 11,086,542 B1
(45) Date of Patent: Aug. 10, 2021

(54) NETWORK-CONFIGURABLE SNAPSHOT LOAD ORDER PROPERTIES

(71) Applicant: Amazon Technologies, Inc., Seattle, WA (US)

(72) Inventors: Sandeep Kumar, Sammamish, WA (US); Shailendra Verma, Bellevue, WA (US); Ashish Palekar, Clyde Hill, WA (US); Chakravarthi Kalyana Valicherla, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/799,247

(22) Filed: Feb. 24, 2020

(51) Int. Cl.
G06F 12/00 (2006.01)
G06F 3/06 (2006.01)
G06F 11/07 (2006.01)
G06F 9/50 (2006.01)
G06F 11/14 (2006.01)

(52) U.S. Cl.
CPC ............. G06F 3/064 (2013.01); G06F 3/061 (2013.01); G06F 3/067 (2013.01); G06F 3/0611 (2013.01); G06F 3/0619 (2013.01); G06F 3/0655 (2013.01); G06F 9/5016 (2013.01); G06F 9/5027 (2013.01); G06F 11/0727 (2013.01); G06F 11/1448 (2013.01); G06F 11/1451 (2013.01); *G06F 2201/84* (2013.01); *G06F 2201/845* (2013.01)

(58) Field of Classification Search
CPC ...... G06F 3/064; G06F 3/0611; G06F 3/0619; G06F 3/0655; G06F 3/067; G06F 9/5027; G06F 11/0727; G06F 2201/84; G06F 11/1448; G06F 11/1451; G06F 2201/845; G06F 3/061

See application file for complete search history.

(56) References Cited

U.S. PATENT DOCUMENTS

| | | | |
|---|---|---|---|
| 8,131,924 B1* | 3/2012 | Frandzel | G06F 3/0682 711/113 |
| 9,417,815 B1 | 8/2016 | Elisha | |
| 9,569,123 B2 | 2/2017 | Desantis et al. | |
| 10,223,365 B2* | 3/2019 | Kottomtharayil | G06F 11/1448 |
| 10,324,803 B1 | 6/2019 | Agarwal | |
| 10,545,776 B1 | 1/2020 | Kowalski et al. | |
| 10,592,351 B1* | 3/2020 | Desai | G06F 12/0871 |
| 10,824,513 B1* | 11/2020 | Chandrashekhara | G06F 3/0656 |
| 2014/0330784 A1* | 11/2014 | Sundaram | G06F 3/0604 707/639 |
| 2015/0212893 A1* | 7/2015 | Pawar | G06F 11/1448 707/649 |
| 2015/0212897 A1* | 7/2015 | Kottomtharayil | G06F 11/1464 714/20 |
| 2016/0048430 A1* | 2/2016 | Bolik | G06F 11/1469 711/162 |

(Continued)

*Primary Examiner* — John A Lane
(74) *Attorney, Agent, or Firm* — Knobbe Martens Olson & Bear, LLP

(57) ABSTRACT

Generally described, one or more aspects of the present application relate to a public snapshot service for associating a block-level snapshot with certain snapshot properties that indicate a block load order, and creating a block storage volume from the snapshot by loading the blocks in the snapshot onto the block storage volume in the block load order indicated by the snapshot properties associated with the snapshot.

20 Claims, 8 Drawing Sheets

(56) References Cited

U.S. PATENT DOCUMENTS

| | | | |
|---|---|---|---|
| 2016/0314046 A1* | 10/2016 | Kumarasamy | G06F 11/1451 |
| 2017/0031616 A1* | 2/2017 | Vijayan | G06F 3/0683 |
| 2017/0286234 A1* | 10/2017 | Shulga | G06F 9/4401 |
| 2019/0332593 A1* | 10/2019 | Graham | G06F 11/00 |
| 2020/0348876 A1* | 11/2020 | Sergeev | G06F 3/0619 |
| 2021/0034397 A1* | 2/2021 | Denny | G06F 11/1464 |

\* cited by examiner

SNAPSHOT 504

Block 1 Block 2 Block 3 Block 4 Block 5 Block 6 Block 7 Block 8 Block 9 Block 10 Block 11 Block 12 Block 13 Block 14 Block 15 Block 16 Block 17 Block 18 Block 19 Block 20

LOAD ORDER DOCUMENT 502

PRIORITIZED BLOCKS:
BLOCKS 11-14
BLOCK 17
BLOCKS 8-6

CONTINUE?
YES

*FIG. 5*

NETWORK-CONFIGURABLE SNAPSHOT LOAD ORDER PROPERTIES

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

BRIEF DESCRIPTION OF THE DRAWINGS

FIG. 5 depicts an example arrangement of blocks in a snapshot and a corresponding load order document in accordance with aspects of the present disclosure.

DETAILED DESCRIPTION

Introduction

Figure 1:
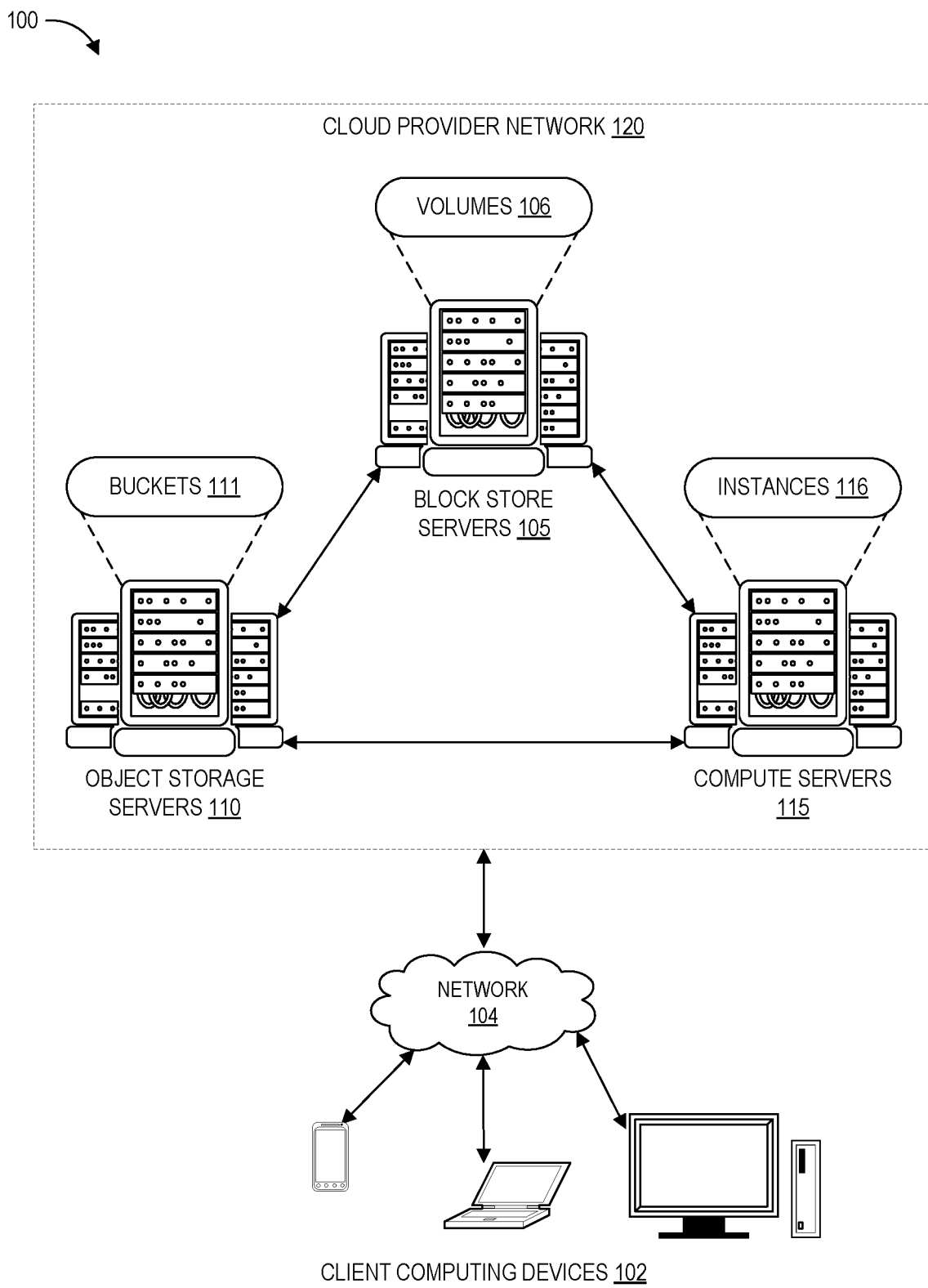
FIG. 1 depicts a schematic diagram of a cloud provider network in which various embodiments according to the present disclosure can be implemented.

Generally described, aspects of the present disclosure relate to the more interactive and efficient restoration of "snapshots" (e.g., computing objects that each represent values of every block of a block storage volume or device at a specific point in time), for example, of volumes of data stored using block storage within a networked distributed computing system, such as a cloud provider network, or on-premises storage systems external to such a networked distributed computing system (also referred to herein as private data storage servers). In some implementations, the described technology can beneficially facilitate faster loading of desired blocks and reduced consumption of resources allocated to the networked distributed computing system and/or the users thereof.

In general, a volume can correspond to a logical collection of data, such as a set of data maintained on a user's own proprietary data server or maintained on a data server in the cloud on behalf of a user. Snapshots are typically used to back up block storage, such as a hard drive, so that the device can be reverted to a previous state (e.g., in the event of data corruption or failure). Such snapshots can be stored on storage devices Typically, when a snapshot is restored onto a block storage volume, the blocks stored in the snapshot are loaded onto the block storage volume in a sequential order (e.g., starting with the first block at the beginning of the snapshot to the last block at the end of the snapshot). For example, restoring a snapshot of a 500 GB volume can take several hours. Thus, if the user (or an application running on behalf of the user) requesting the creation of the block storage volume needs to access certain blocks towards the end of the snapshot, such blocks may take a while before they are loaded onto the block storage volume. If the user tries to access the blocks before they have been loaded onto the block storage volume, the blocks will be fetched directly from the location in which the snapshot is stored, which results in a much higher latency than accessing the block from the block storage volume.

Additionally, when the blocks are fetched from the location of the snapshot due to being unavailable at the block storage volume, resources allocated to the user (e.g., I/O's) are consumed instead of resources allocated to the system (e.g., resources reserved for background operations). Thus, the user may waste his or her resources on operations that can be done using the system's resources (e.g., by only accessing blocks that have been loaded onto the block storage volume, and not fetching out of order directly from the location of the snapshot).

Further, when a snapshot is restored onto a storage volume, typically, all of the blocks in the snapshot are restored. Thus, if the user is interested in accessing only a portion of the storage volume, restoring all of the blocks results in a waste of the system's resources that could have been used for performing other tasks. Thus, an improved method of being able to specify the order in which the blocks of a snapshot are loaded onto the block storage volume is desired.

The presently disclosed technology addresses these problems by providing an interface through which a client can specify to a public snapshot service a snapshot property to be associated with a snapshot. Such a snapshot property can be stored by the public snapshot service and utilized when restoring the snapshot onto a new block storage volume.

More specifically, the snapshot property may specify a block load order in which one or more of the blocks in the snapshot are to be loaded onto the block storage volume (e.g., as an ordered list of blocks). By allowing the user to associate a snapshot with a snapshot property specifying a block load order, and to create a storage volume from the snapshot according to the block load order, the public snapshot service facilitates faster loading of desired blocks, which increases the likelihood that those blocks will be available at the time the user requests those blocks, which results in a lower latency, thereby improving the experience of the user. Further, while the user-requested fetching of specific blocks consumes user's resources (e.g., I/O's), the loading of blocks from the snapshot according to a sequential order or a load order specified by the snapshot properties consumes the system's resources. Thus, by allowing the user to associate a snapshot with a snapshot property specifying a block load order, and to create a storage volume from the snapshot according to the block load order, the public snapshot service also reduces the consumption of the resources allocated to the user.

As will be appreciated by one of skill in the art in light of the present disclosure, the embodiments disclosed herein improve the ability of computing systems, such as block store systems and object storage systems, to provide mechanisms for controlling the order in which the transfer of data occurs between an object storage system storing the snapshot and a block store system on which the block storage volume is hosted. Prior techniques generally did not allow access to the snapshots and simply relied on sequential block transfer methods, and therefore resulted in higher latencies for block access and unnecessary consumption of the user's I/O resources, since the order in which the blocks on the block storage volume are accessed do not necessarily follow a sequential order and a block located at the end of the snapshot may be accessed before one or more of its preceding blocks (and before the blocks are completely loaded onto the block storage volume). In contrast, embodiments of the present disclosure enable users of the snapshots to specify certain snapshot properties that can be used to guide the snapshot restoration process to obtain better latencies for accessing the blocks and reduce resource consumption (e.g., utilizing the system's I/O resources rather than the user's own I/O resources). The presently disclosed embodiments therefore address technical problems inherent within computing systems, such as the difficulty of designing a system of aligning block access patterns with block load sequence from snapshots, especially when the content of the snapshots may be controlled by the user and not the system. These technical problems are addressed by the various technical solutions described herein, including the association of snapshots with user-specified snapshot properties and creation of block storage volumes from the snapshots according to the user-specified snapshot properties. Thus, the present disclosure represents an improvement on existing block store systems and object storage systems, and computing systems in general.

These and other aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting.

Overview of Example Computing Environment for Public Snapshot Service

FIG. 1 depicts an example computing environment 100 including a cloud provider network 120 in which the disclosed public snapshot service can be implemented. A cloud provider network (sometimes referred to as a cloud provider system or simply a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and the hardware and software in cloud provider data centers that provide those services. It will be appreciated that the disclosed snapshot properties association and storage volume creation techniques may be implemented in non-elastic computing environments as well.

The cloud provider network 120 can be accessed by client computing devices 102 over a network 104. The cloud provider network 120 includes one or more block store servers 105, one or more object storage servers 110, and one or more compute servers 115 that are in networked communication with one another and with the network 104 to provide users with on-demand access to computing resources including volumes 106, buckets 111, and instances 116, among others. These particular resources are described in further detail below. Some implementations of cloud provider network 120 can additionally include domain name services ("DNS") servers, relational database servers, and other server configurations (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can provide on-demand, scalable computing platforms to users through the network 104, for example allowing users to have at their disposal scalable "virtual computing devices" via their use of the block store servers 105, object storage servers 110, and compute servers 115. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability Turning specifically to the roles of the different servers within the cloud provider network 120, the compute servers 115 include one or more servers on which provide resizable computing capacity to users for building and hosting their software systems. The compute servers 115 and associated control plane functionality can provide an elastic compute cloud service of the cloud provider network. Compute services can be referred to as a virtual compute service, or cloud compute service, in various implementations. Users can use the compute servers 115 to launch as many virtual computing environments, referred to as virtual compute instances, virtual machine instances, virtual machines, or "instances" 116, as they need. Instances 116 can have various configurations of processing power, memory, storage, and networking capacity depending upon user needs. The compute servers 115 can also include computer storage for temporary data used while an instance is running, however as soon as the instance is shut down this data is lost.

The block store servers 105 provide persistent data storage for the compute servers 115 in the form of volumes 106, each of which represents a virtualized, network-accessible block-storage device (e.g., a virtual "hard disk"). The block store servers 105 and associated control plane functionality can provide an elastic block store service of the cloud provider network. Block storage services can be referred to as a cloud disk service, managed disk service, storage area network service, persistent disk service, or block volume service, in various implementations. Data of volumes 106 may be encrypted or unencrypted. The block store servers 105 include one or more servers on which data is stored as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 kB, 8 kB, 16 kB, 32 kB, 64 kB, 128 kB, 256 kB, 512 kB, or larger, depending upon the implementation. The snapshots described herein may include any number of such blocks. The size of a snapshot may vary, depending for example upon the size of the user volume for which the snapshot is created.

Block storage volumes 106, which can be treated as an individual hard drive ranging for example from 1 GB to 1 terabyte TB (or more) in size, are made of one or more blocks stored on the block store servers 105. Although treated as an individual hard drive, it will be appreciated that a volume may be stored as one or more virtualized devices implemented on one or more underlying physical host devices. Volumes 106 may be partitioned a small number of times (e.g., up to 16) with each partition hosted by a device of the cloud provider network 120 that has the ability to transfer data at around 1 GB per second ("Gbps") in some implementations. These volumes provided persistent, dedicated storage that can be attached to particular instances of the compute servers 115. Each volume may be attached to a single instance running on a compute server 115, and can be detached from that instance and re-attached to another. The block store servers 105 may have built-in redundancy for volumes by replicating the volume across multiple servers within an availability zone, which means that volumes will not fail if an individual drive fails or some other single failure occurs.

In general, a volume can correspond to a logical collection of data, such as a set of data maintained on behalf of a user. The data of the volume may be replicated between multiple devices within a distributed computing system, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume (e.g., those requested by one or more virtual machine instances to which the volume is attached), and to propagate any writes to the secondary replica (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas.

The object storage servers 110 represent another type of storage within the cloud provider network 120. The object storage servers 110 and associated control plane functionality can provide an object-based storage service of the cloud provider network. Object-based storage services can be referred to as a blob storage service, cloud object storage service, or cloud storage service, in various implementations. The object storage servers 110 include one or more servers on which data is stored as objects within resources referred to as buckets 111. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, such that authorized access to them can be obtained through requests from networked computing devices in any location. Each bucket 111 is associated with a given user account. Users can store as many objects as desired within their buckets, can write, read, and delete objects in their buckets, and can control access to their buckets and the objects contained therein. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. Applications developed in the cloud often take advantage of the vast scalability and metadata characteristics of the object storage servers 110. The object storage servers 110 can support highly parallel data accesses and transfers.

The object storage servers 110 can offer even greater redundancy than the block store servers 105, as the object storage servers 110 can automatically replicate data into multiple availability zones. The object storage servers 110 also have different data throughput than the block store servers 105, for example around 20 Mbps for a single stream of data. While the object storage servers 110 can be used independently from the instances 116 and volumes 106 described above, they can also be used to provide data backup as described herein with respect to snapshots (e.g., object-stored backups of volume data).

In one embodiment, a snapshot is a point-in-time block-level backup of the volume, stored as a copy of data on the volume on one or more of the object storage servers 110 (e.g., as a single object or a collection of objects). In addition or as an alternative to managing snapshots through general interfaces for the object storage servers 110, snapshots may be managed through the application programming interface ("API") of the block store servers 105 and/or the API of the public snapshot service 130 implemented on the cloud provider network 120. Illustratively, when the first snapshot of a volume is taken, all blocks of the volume that contain valid data are copied as one or more objects to the object storage servers 110, and then a snapshot "table of contents" or "manifest" file is written to the object storage servers 110 that includes a record of the one or more objects, as well as the blocks of the volume to which each of the one or more objects correspond.

When creating a snapshot, any data written to the volume up to the time the snapshot is started can be included in the snapshot, and users can continue to perform I/O operations to their volumes during snapshot creation without affecting the snapshot. Users can create a new volume from a snapshot, for example to create duplicates of their volumes or to restore data. The new volume will contain all the data stored in the snapshot and thus will be a duplicate of the original volume at the time the snapshot was started. In this manner, snapshots can also be used to transfer a volume's data from one availability zone to another. Similarly, snapshots can be taken of instances to create a new virtual machine instance of that instance.

As illustrated in FIG. 1, the cloud provider network 120 can communicate over network 104 with client computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. Client computing devices 102 can include any network-equipped computing device, for example desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

Overview of Example Public Snapshot Service

Figure 2:
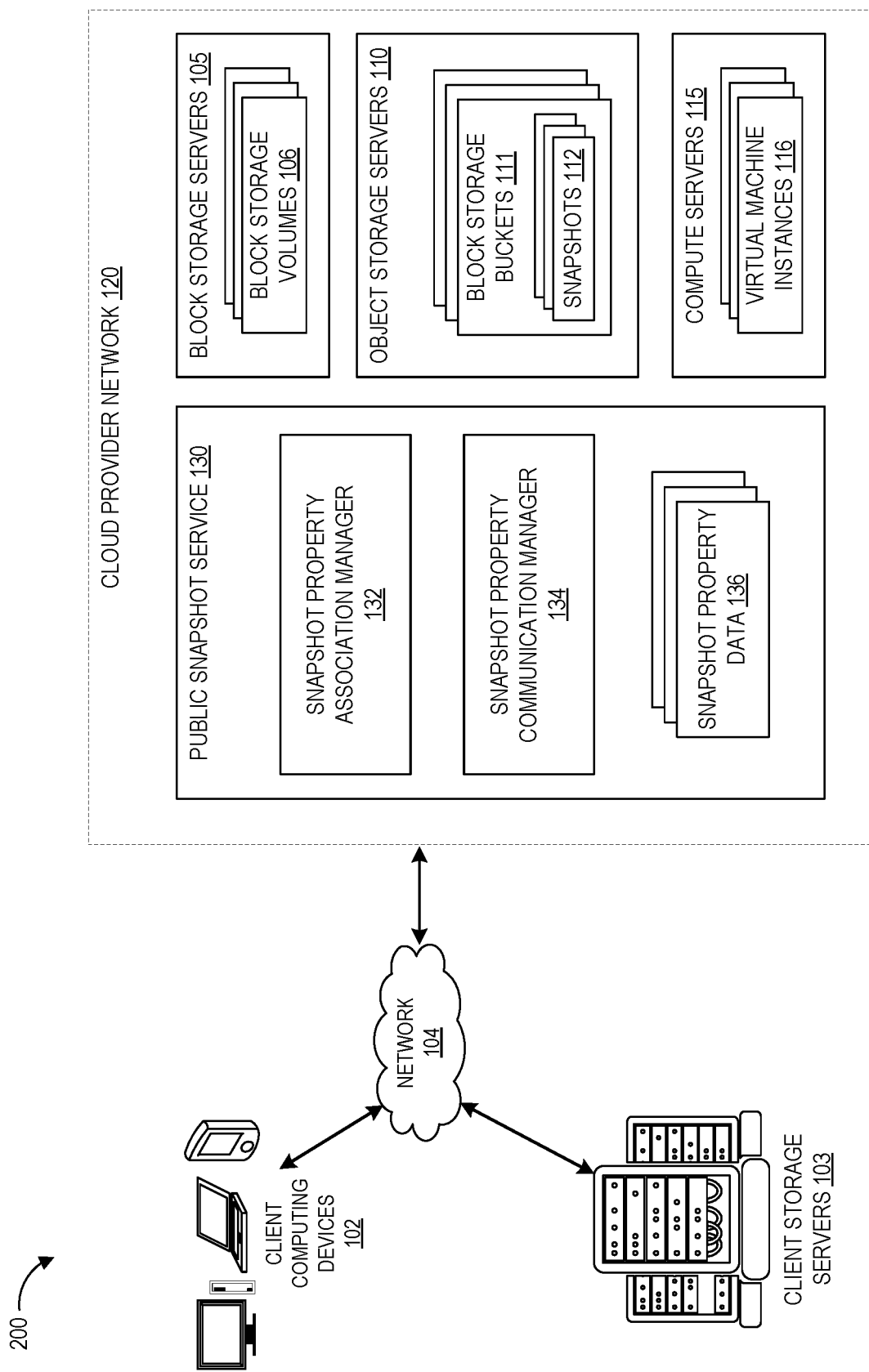
FIG. 2 depicts a schematic diagram of a network environment in which the cloud provider network of FIG. 1 is used to implement a public snapshot service and its components in accordance with aspects of the present disclosure.

FIG. 2 depicts a more detailed computing environment 200 in which the public snapshot service 130 is implemented on the cloud provider network 120. More specifically, the computing environment 200 includes the client computing devices 102 and the client storage servers 103 in communication with the cloud provider network 120 via the network 104. The public snapshot service 130 as implemented by the cloud provider network 120 of FIG. 2 includes a snapshot property association manager 132, a snapshot property communication manager 134, and snapshot property data 136. Additionally, the elastic computing 120 further includes the block store servers 105, the object storage servers 110, and the compute servers 115 of FIG. 1. As shown in FIG. 2, the block store servers 105 provide block storage volumes 106, the object storage servers 110 provide block storage buckets 111 (which store snapshots 112, and sometimes referred to herein as a "snapshot repository"), and the compute servers 115 provide virtual machine instance 116.

The public snapshot service 130 may provide a set of APIs that can be used by the users of the client computing devices 102 to request that a snapshot be associated with certain snapshot properties, to list or view the snapshot properties associated with the snapshot, to create storage volumes based on the snapshot according to the associated snapshot properties. The snapshot property association manager 132 of the public snapshot service 130 may create and store associations between snapshots and corresponding snapshot properties for use during the storage volume creation process. The snapshot property communication manager 134 of the public snapshot service 130 may receive requests, from block store servers 105, for snapshot properties associated with snapshots 112. In response, the block store servers 105 can create storage volumes from the snapshots 112 stored in the block storage buckets 111 according to the snapshot properties associated with the snapshots. The snapshot property communication manager 134 may further allow users to view a list of snapshot properties currently associated with a given snapshot, to designate one of the snapshot properties as a default snapshot property, and/or to dissociate one or more of the snapshot properties from the snapshot or remove such properties such that the snapshot is no longer associated with such snapshot properties. The snapshot property data 136 may include the snapshot properties described herein and/or the associations between the snapshots 112 and such snapshot properties. The operations of the public snapshot service 130 are described in greater detail below with reference to FIGS. 3-7.

The block store servers 105 host block storage volumes 106, which can be created from snapshots stored in the block storage buckets 111 hosted on the object storage servers 110. The compute servers 115 host the virtual machine instances 116, which can run applications on behalf of the users of the cloud provider network 120. One or more of the block storage volumes 106 may be attached to the virtual machine instances 116, and the applications running on the virtual machine instances 116 can access the data stored on the block storage volumes 106 and/or the data stored in the block storage buckets 111 as needed.

Example Workflow for Creating Volume without Specific Load Order

Figure 3:
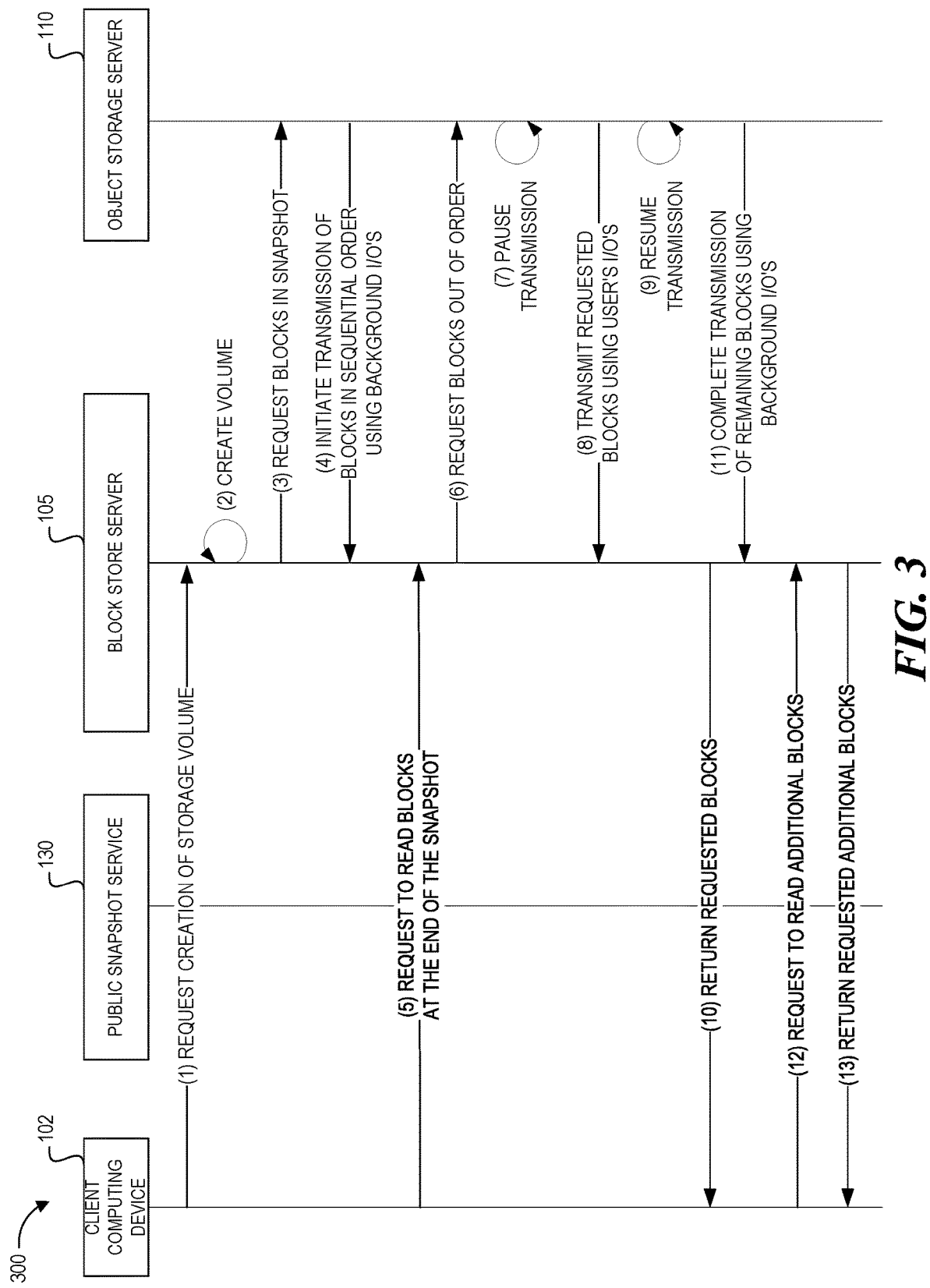
FIG. 3 depicts an example workflow for creating a storage volume within the network environment of FIG. 2 in accordance with aspects of the present disclosure.

FIG. 3 depicts interactions among the various components shown in FIG. 2 in creating a storage volume from a snapshot in accordance with aspects of the present disclosure. As shown in FIG. 3, at (1), the client computing device 102 calls an API provided by the block store server 105 to request creation of a storage volume from a snapshot stored on the object storage server 110. The API call may specify the parameters to be used to identify the snapshot such as a snapshot ID, volume type (SDD-backed vs. HDD-backed), size, maximum Input/Output Operations Per Second (IOPS), region/availability zone, to name a few. At (2), the block store server 105 creates the storage volume requested by the user. At (3), the block store server 105 sends a request to the object storage server 110 storing the snapshot for the blocks in the snapshot.

At (4), the object storage server 110 initiates transmission of the blocks in the snapshot in a sequential order (e.g., from a block at the beginning of the snapshot to the block at the end of the snapshot) using background I/O's allocated for background operations performed by the components of the cloud provider network 120 (e.g., as opposed to user I/O's allocated for performing user operations). At (5), the client computing device 102 requests to read blocks at the end of the snapshot, which have not yet been loaded onto the storage volume from the object storage server 110. As a result, at (6), the block store server 105 requests those blocks from the object storage server 110.

In response, at (7), the object storage server 110 pauses the sequential transmission of the blocks, at (8), transmits the requested blocks to the block store server 150 using the user's I/O's, and at (9), resumes the paused sequential transmission of the blocks. At (10), the block store server 105 returns the requested blocks to the client computing device 102. At (11), the object storage server 110 completes transmission of remaining blocks using background I/O's. After all the blocks have been loaded onto the storage volume, at (12), the client computing device 102 requests to read additional blocks on the storage volume, and at (13), the block store server 105 returns the requested additional blocks to the client computing device 102.

In some embodiments, the client computing device 102 may be a virtual machine instance running on behalf of the user on the cloud provider network 120. For example, a virtual machine instance may be attached to the storage volume after (2), and the virtual machine instance may send the requests (5) and (12) to the block store server 105. As illustrated, if a requested block has already been loaded onto the storage volume, the block can be sent directly by the block store server 105 instead of having the request the block from the object storage server 110, resulting in a lower latency.

Example Workflow for Creating Volume with Specific Load Order

Figure 4:
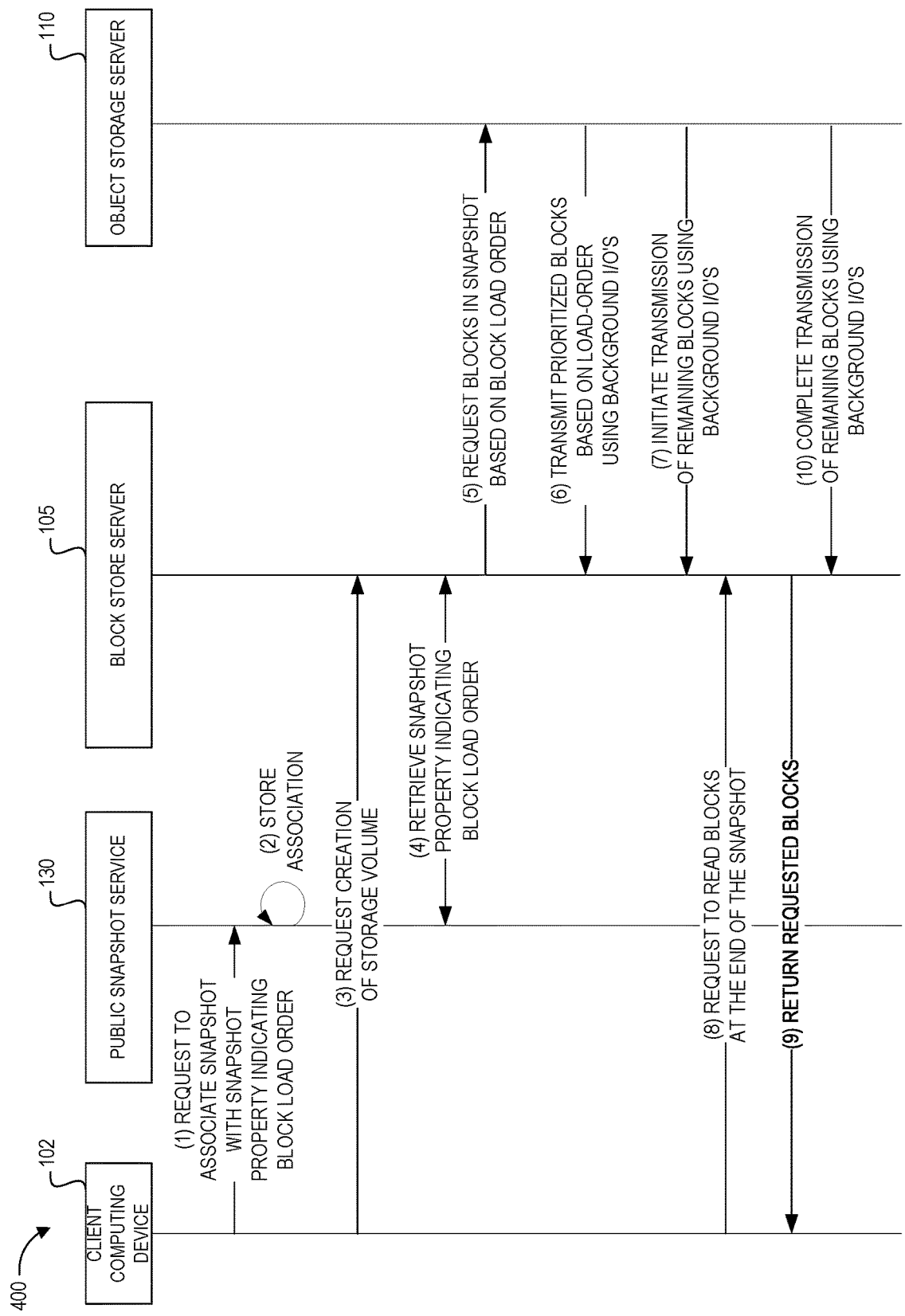
FIG. 4 depicts another example workflow for creating a storage volume within the network environment of FIG. 2 in accordance with aspects of the present disclosure.

FIG. 4 depicts interactions among the various components shown in FIG. 2 in creating a storage volume from a snapshot in accordance with aspects of the present disclosure. As shown in FIG. 4, at (1), the client computing device 102 calls an API provided by the public snapshot service 130 to request to associate a snapshot stored on the object storage server 110 with one or more snapshot properties, where the snapshot properties indicate a block load order in which the blocks of the snapshot are to be loaded in the event that a storage volume is created from the snapshot. At (2), the public snapshot service 130 stores the requested association between the snapshot and the snapshot properties.

At (3), the client computing device 102 calls an API provided by the block store server 105 to request creation of a storage volume from a snapshot stored on the object storage server 110. The API call may specify the parameters to be used to create the storage volume such as volume type (SDD-backed vs. HDD-backed), size, maximum Input/Output Operations Per Second (TOPS), region/availability zone, snapshot ID, to name a few. At (4), the block store server 105 retrieves (e.g., requests and receives) from the snapshot service 130 one or more snapshot properties associated with the snapshot that was identified by the block store server 105 in response to (3). In some embodiments, the public snapshot service 130 may indicate the identity or location of the one or more snapshot properties associated with the snapshot, and the block store server 105 may access the one or more snapshot properties using the identity or location. At (5), the block store server 105 sends a request to the object storage server 110 storing the snapshot to send the blocks in the snapshot in the load order specified by the one or more snapshot properties retrieved at (5).

At (6), the object storage server 110 transmits the prioritized blocks based on the load order specified by the snapshot properties using background I/O's allocated for background operations performed by the components of the cloud provider network 120 (e.g., as opposed to user I/O's allocated for performing user operations). At block (7), the object storage server 110 initiates transmission of the remaining blocks in the snapshot (e.g., the blocks that are not part of the prioritized list) using background I/O's. At (8), the client computing device 102 requests to read blocks at the end of the snapshot. In the example of FIG. 4, such blocks were part of the prioritized list specified by the snapshot properties and have already been loaded onto the storage volume. As a result, at (9), the block store server 105 returns the requested blocks to the client computing device 102. At (10), the object storage server 110 completes transmission of remaining blocks using background I/O's.

As illustrated, by allowing the user to associate a snapshot with snapshot properties specifying a block load order, and to create a storage volume from the snapshot according to the block load order, the public snapshot service 130 facilitates faster loading of desired blocks, which increases the likelihood that those blocks will be available at the time the user requests those blocks, which results in a lower latency, thereby improving the experience of the user. Further, in the examples of FIGS. 3 and 4, while the user-requested fetching of specific blocks consumes user's I/O's, the loading of blocks from the snapshot according to the sequential order or specific load order specified by the snapshot properties consumes background I/O's. Thus, by allowing the user to associate a snapshot with snapshot properties specifying a block load order, and to create a storage volume from the snapshot according to the block load order, the public snapshot service 130 also reduces the consumption of the resources allocated to the user.

Example Arrangement of Blocks and Load Order Document

FIG. 5 depicts an example arrangement of blocks 1-20 in a snapshot 504 and a corresponding load order document 502 (also referred to herein as "snapshot property") in accordance with aspects of the present disclosure. In FIG. 5, the load order document 502 indicates that blocks 11-14, 17, and 8-6 are prioritized and should be loaded onto the storage volume created from the snapshot 504 (e.g., block 11, block 12, block 13, block 14, block 17, block 8, block 7, and then block 6). The prioritized blocks are highlighted in FIG. 5. The load order document 502 also indicates whether the remaining blocks (e.g., blocks 1-5, 9, 10, 15, 16, and 18-20) should be loaded onto the storage volume after all the prioritized blocks have been loaded. In the example of FIG. 5, the load order document 502 indicates that the remaining blocks should be loaded. Based on the indication, after all the prioritized blocks have been loaded, the remaining blocks may be loaded onto the storage volume in a sequential order. Alternatively, in other embodiments, if the load order document indicates that the remaining blocks should not be loaded, no other blocks would be loaded onto the storage volume after all the prioritized blocks have been loaded (e.g., the blocks whose load order is specified in the load order document). Additional details relating to a load order document are provided in U.S. application Ser. No. 15/277,162 (U.S. Pat. No. 10,545,776), titled "THROUGHPUT AND LATENCY OPTIMIZED VOLUME INITIALIZATION," which is incorporated herein by reference in its entirety.

Example Routine for Associating a Snapshot with a Snapshot Property

Figure 6:
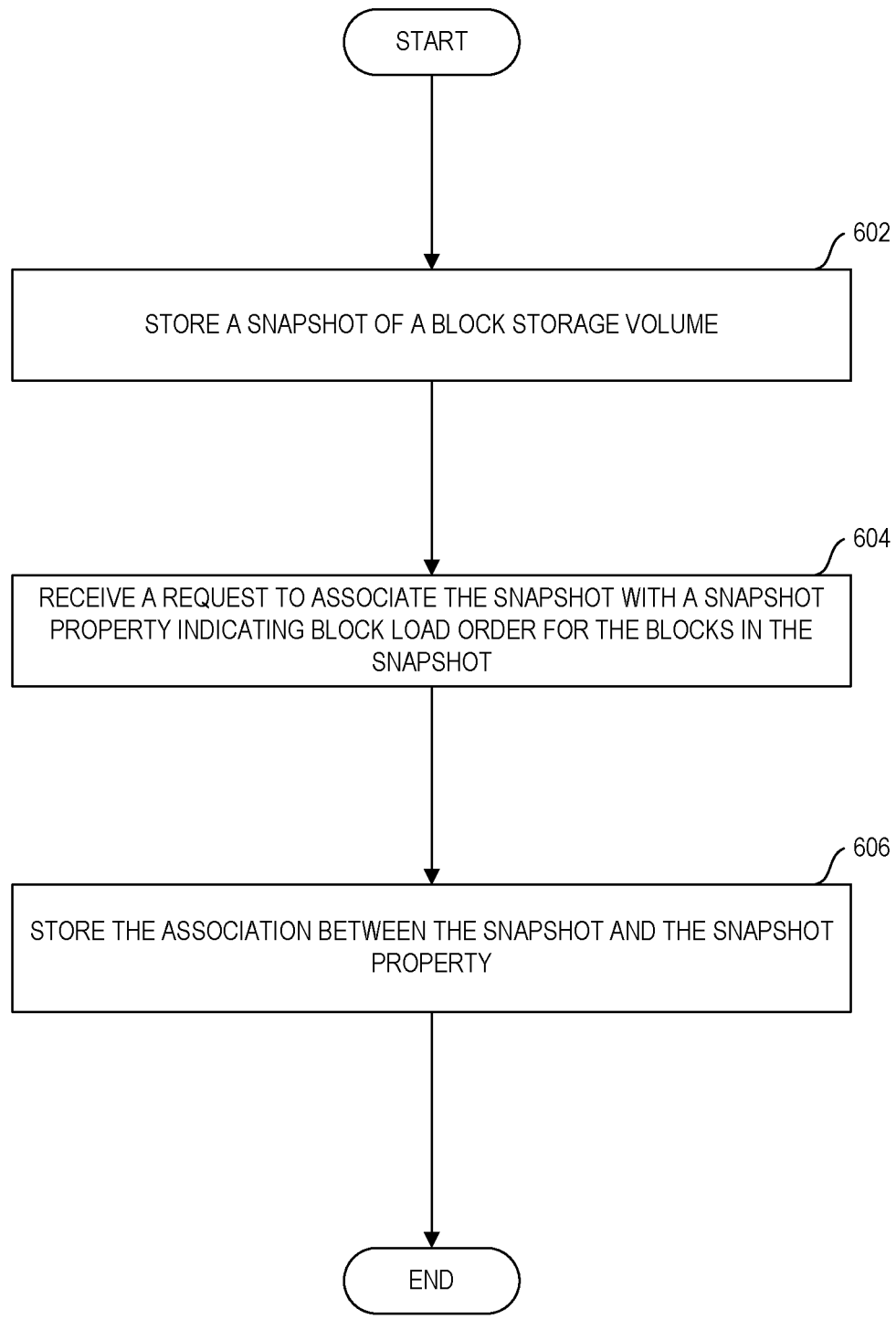
FIG. 6 is a flowchart of an example process for associating snapshot properties with a snapshot in accordance with aspects of the present disclosure.

As illustrated in FIGS. 3 and 4, the public snapshot service 130 can allow a user to associate a snapshot with certain snapshot properties indicating a specific load order for one or more of the blocks in the snapshot, and create a storage volume from the snapshot according to the specific load order indicated by the snapshot properties, such that the blocks that the user needs to access right away can be prioritized in loading the blocks in the snapshot from the location where the snapshot is stored onto the storage volume. By doing so, the public snapshot service 130 facilitates faster loading of desired blocks, which increases the likelihood that those blocks will be available at the time the user requests those blocks, which results in a lower latency, thereby improving the experience of the user. Further, in the examples of FIGS. 3 and 4, while the user-requested fetching of specific blocks consumes user's own resources (e.g., I/O's), the loading of blocks from the snapshot according to the sequential order or specific load order specified by the snapshot properties consumes the system's resources. Thus, by allowing the user to associate a snapshot with snapshot properties specifying a block load order, and to create a storage volume from the snapshot according to the block load order, the public snapshot service 130 also reduces the consumption of the resources allocated to the user. With reference to FIG. 6, the snapshot property association process is described in greater detail.

FIG. 6 depicts an illustrative routine 600 for associating a block-level snapshot with a snapshot property in accordance with aspects of the present disclosure. The routine 600 may be carried out, for example, by the public snapshot service 130 or one or more other components of the cloud provider network 120 described herein. For convenience, the steps of routine 600 are described as being performed by a public snapshot server. For example, such a public snapshot server may include one or more hardware computing devices and non-transitory physical computer storage storing instructions that, when executed by the one or more hardware computing devices, cause the one or more hardware computing devices to perform the steps of the routine 600.

The routine 600 begins at 602, wherein the public snapshot server stores a snapshot of a block storage volume. For example, the public snapshot server may store the snapshot in a block storage bucket provided by the object storage servers 110. In one embodiment, the block storage volume is hosted on the block store servers 105. In another embodiment, the block storage volume is hosted on the client storage servers 103.

At block 604, the public snapshot server receives a request to associate the snapshot with a snapshot property indicating a block load order for one or more of the blocks in the snapshot. The one or more blocks (also referred to herein as prioritized blocks) may be specified by the snapshot property as an order list of blocks. In some embodiments, the request may include two or more snapshot properties that each specify a different block load order (e.g., same blocks may be ordered differently, different blocks are prioritized, or both). For example, one snapshot property may prioritize the blocks associated with one set of applications and/or files, and another snapshot property may prioritize the blocks associated with a different set of applications and/or files. When multiple snapshot properties are associated with a single snapshot, a default snapshot property (e.g., one that is to be used when a request to create a volume does not specify one of the snapshot properties) may be designated in the request. If a default snapshot property is not specified in the request, the public snapshot server may select one automatically.

At block 606, the public snapshot server stores the association between the snapshot and the snapshot property, for example, in local storage or in a storage device accessible over a network. The public snapshot server may access the association in response to a request to create a storage volume from the snapshot. The routine 600 may then end.

Although not shown in FIG. 6, subsequent to block 606, an additional snapshot property may be associated with the snapshot to update the block load order and/or the priority blocks. For example, based on monitoring block access patterns, the user may generate an updated snapshot property that specifies a block load order that results in lower latencies and/or reduced resource consumption, and send a request to the public snapshot server to associate the snapshot with the updated snapshot property. In such a case, the updated snapshot property may replace the original snapshot property. Also, in some embodiments, in response to a request to view or list all the snapshot properties associated with a given snapshot from a client computing device, the public snapshot server may generate a list of all the snapshot properties associated with the given snapshot and return the list to the client computing device. The public snapshot server may also remove a snapshot property so that the snapshot property is no longer associated with the snapshot, or designate a snapshot property as a default snapshot property for the snapshot.

Example Routine for Creating a Load-Order-Based Block Storage Volume

Figure 7:
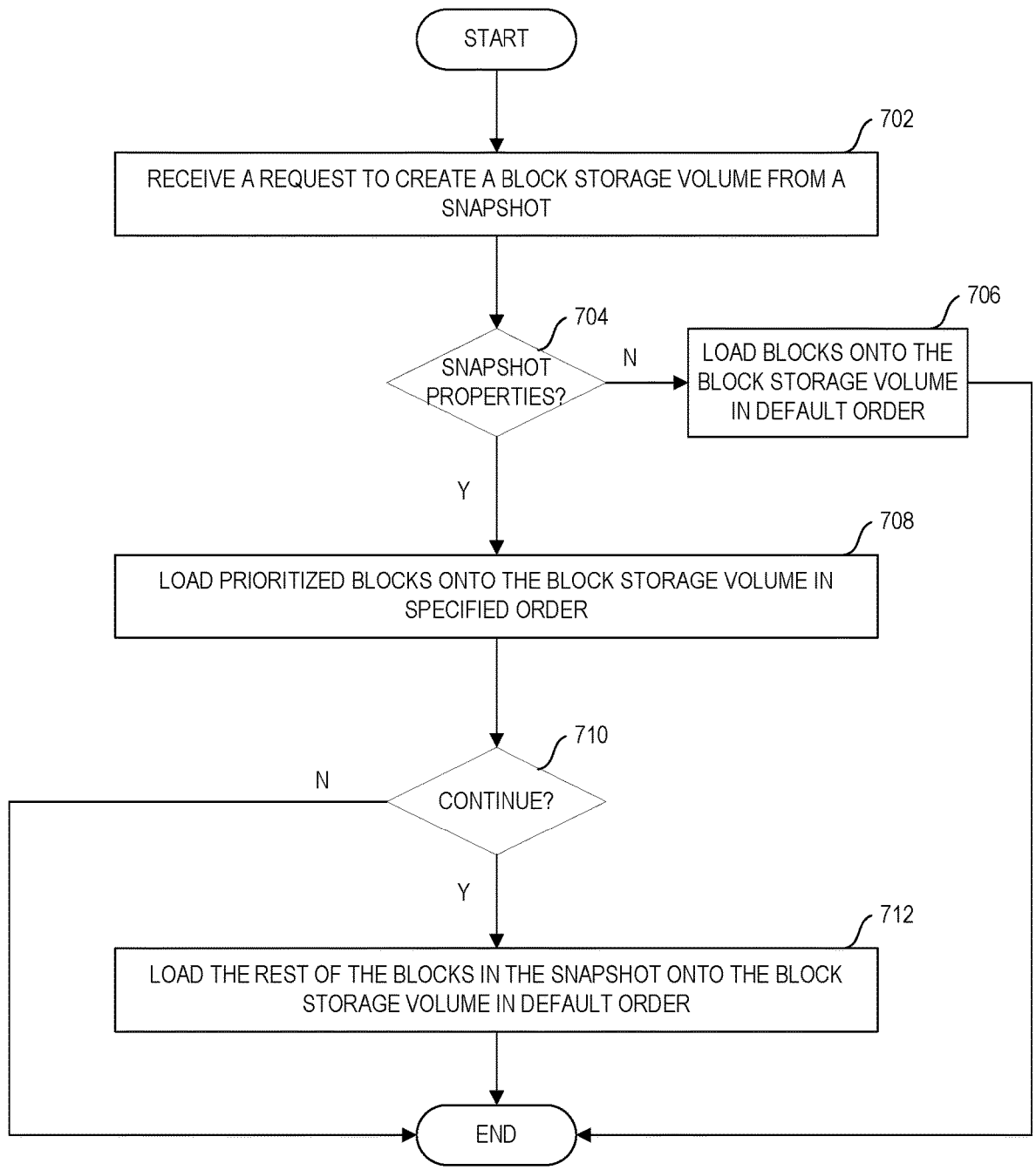
FIG. 7 is a flowchart of an example process for creating a storage volume based on a user-specified load order in accordance with aspects of the present disclosure.

FIG. 7 depicts an illustrative routine 700 for creating a load-order-based block storage volume from a snapshot in accordance with aspects of the present disclosure. The routine 700 may be carried out, for example, by the public snapshot service 130 or one or more other components of the cloud provider network 120 described herein. For convenience, the steps of routine 700 are described as being performed by a public snapshot server. For example, such a public snapshot server may include one or more hardware computing devices and non-transitory physical computer storage storing instructions that, when executed by the one or more hardware computing devices, cause the one or more hardware computing devices to perform the steps of the routine 700.

The routine 700 begins at 702, wherein the public snapshot server receives a request to create a block storage volume from a snapshot. For example, the snapshot may be stored in a block storage bucket provided by the object storage servers 110. The request may specify one or more parameters defining the first storage volume such as volume type (SDD-backed vs. HDD-backed), size, maximum IOPS, region/availability zone, snapshot ID, to name a few.

At block 704, the public snapshot server determines whether the snapshot is associated a snapshot property that can be used to prioritize certain blocks in the snapshot. For example, the public snapshot server perform a lookup of the snapshot ID in a snapshot properties database storing the associations between snapshots and snapshot properties. In some embodiments, the request at block 702 specifies a snapshot property to be used. In such embodiments, the decision block at 704 may include confirming that the specified snapshot property is indeed associated with the snapshot. If the snapshot is associated with a snapshot property, the routine 700 proceeds to block 708. Otherwise, the routine 700 proceeds to block 706, where the public snapshot server loads blocks onto the block storage volume in a default order (e.g., sequential order from the beginning of the snapshot to the end of the snapshot).

At block 708, the public snapshot server loads the prioritized blocks specified by the snapshot property onto the block storage volume in the block load order specified by the snapshot property. In the example of FIG. 5, the prioritized blocks would be loaded onto the block storage volume in the following order: block 11, block 12, block 13, block 14, block 17, block 8, block 7, and then block 6. In the event that multiple snapshot properties are associated with the snapshot, if one of the snapshot properties is specified in the request at block 702, the specified snapshot property is used. Otherwise, a default snapshot property of the multiple snapshot properties is used.

At block 710, the public snapshot server determines whether the remaining blocks of the snapshot should be continued to be loaded onto the block storage volume. For example, the snapshot property may include a flag indicative of whether any blocks of the snapshot not included in the ordered list specified by the snapshot property should be loaded onto the block storage volume. If the snapshot property indicates that the remaining blocks of the snapshot should be continued to be loaded onto the block storage volume, the routine 700 proceeds to 712. Otherwise, the routine 700 may end.

At block 712, the public snapshot server loads the rest of the blocks in the snapshot onto the block storage volume in a default order (e.g., sequential order). After all the remaining blocks of the snapshot have been loaded onto the block storage volume, the routine 700 may end.

Although FIG. 6 is described in the context of using a single snapshot property to create a block storage volume, in other embodiments, multiple snapshot properties are used to create a blocks storage volume. In such embodiments, the request to create the volume may specify an ordered list of snapshot properties to be used to create the volume, and the block load orders specified in the specified snapshot properties are used one at a time. In such embodiments, a single volume can be created using one snapshot property that prioritizes the blocks associated with one set of applications and/or files, and another snapshot property that prioritizes the blocks associated with another set of applications and/or files, without requiring the user to create a separate snapshot property for each combination of applications and/or files that the user wishes to gain expedited access. For example, if the first snapshot property specifies to prioritize blocks 10-15, and the second snapshot property specifies to prioritize blocks 6-11, the public snapshot server may load blocks 10-15 according to the first snapshot property, and then load blocks 6-9 (since blocks 10 and 11 have already been loaded) according to the second snapshot property. Depending on the embodiment, the public snapshot server may stop there or continue to load the remaining blocks in the snapshot.

Example Architecture of Public Snapshot Service

Figure 8:
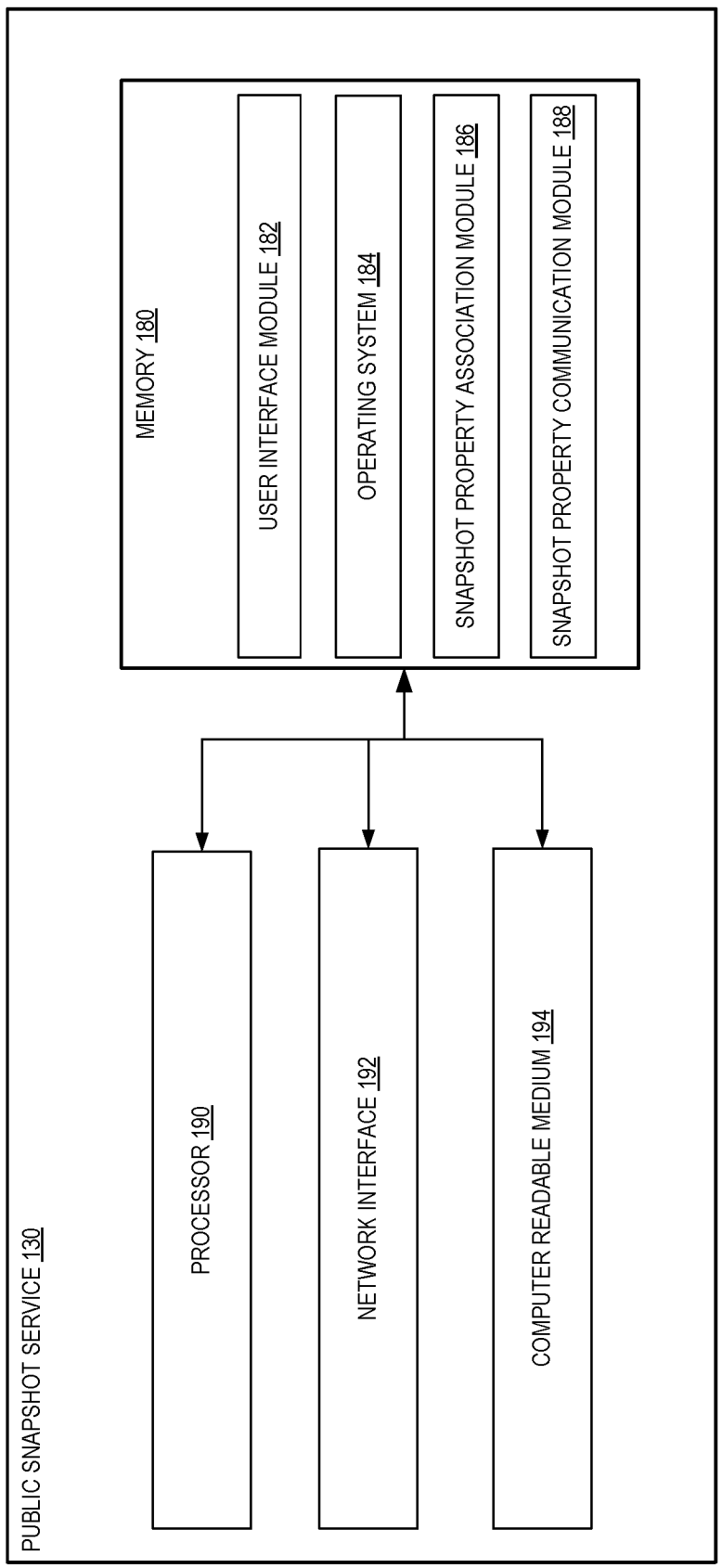
FIG. 8 depicts a general architecture of a computing device or system providing a public snapshot service in accordance with aspects of the present disclosure.

FIG. 8 depicts an example architecture of a computing system (referred to as the public snapshot service 130) that can be used to perform one or more of the techniques described herein or illustrated in FIGS. 1-7. The general architecture of the public snapshot service 130 depicted in FIG. 8 includes an arrangement of computer hardware and software modules that may be used to implement one or more aspects of the present disclosure. The public snapshot service 130 may include many more (or fewer) elements than those shown in FIG. 8. It is not necessary, however, that all of these elements be shown in order to provide an enabling disclosure. As illustrated, the public snapshot service 130 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIGS. 1 and 2.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 184 that provides computer program instructions for use by the processor 190 in the general administration and operation of the public snapshot service 130. The memory 180 may further include computer program instructions and other information for implementing one or more aspects of the present disclosure. For example, in one embodiment, the memory 180 includes a user interface module 182 that generates user interfaces (and/or instructions therefor) for display upon a client computing device (e.g., client computing device 102 of FIG. 2), e.g., via a navigation and/or browsing interface such as a browser or application installed on the client computing device. In addition, the memory 180 may include or communicate with one or more data stores.

In addition to and/or in combination with the user interface module 182, the memory 180 may include a snapshot property association module 186 and a snapshot property communication module 188 that may be executed by the processor 190. In one embodiment, the snapshot property association module 186 and the snapshot property communication module 188 individually or collectively implement various aspects of the present disclosure, e.g., creating an association between a snapshot and one or more snapshot properties, creating a storage volume based on the snapshot according to the one or more snapshot properties associated therewith, and/or other aspects discussed herein or illustrated in FIGS. 1-7.

While the snapshot property association module 186 and the snapshot property communication module 188 are shown in FIG. 8 as part of the public snapshot service 130, in other embodiments, all or a portion of the snapshot property association module 186 and the snapshot property communication module 188 may be implemented by other components of the cloud provider network 120 and/or another computing device. For example, in certain embodiments of the present disclosure, another computing device in communication with the cloud provider network 120 may include several modules or components that operate similarly to the modules and components illustrated as part of the public snapshot service 130. It will also be appreciated that, in some embodiments, a client computing device (e.g., the client computing device 102 of FIG. 2) may implement functionality that is otherwise described herein as being implemented by the elements and/or modules of the public snapshot service 130. For example, the client computing device 102 may receive code modules or other instructions from the public snapshot service 130 and/or other components of the cloud provider network 120 via the network 104 that are executed by the client computing device 102 to implement various aspects of the present disclosure.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system, comprising:
    a cloud provider system comprising:
        a snapshot repository for storing block-level snapshots; and
        a public snapshot server in networked communication with the snapshot repository; and
    wherein the public snapshot server is configured to:
        receive a snapshot property association request to create an association between a first snapshot stored in the snapshot repository and a first snapshot property, wherein the first snapshot includes a plurality of blocks, and the first snapshot property indicates a block load order for one or more prioritized blocks of the plurality of blocks in the first snapshot;
        store the association between the first snapshot and the first snapshot property such that a storage volume created from the first snapshot is hydrated according to the block load order indicated by the first snapshot property;
        receive a snapshot property list request for a list of one or more snapshot properties associated with the first snapshot;
        output a snapshot property list associated with the first snapshot, the snapshot property list including at least the first snapshot property;
        receive a storage volume creation request to create a first storage volume from the first snapshot stored in the snapshot repository, wherein the storage volume creation request specifies one or more parameters defining the first storage volume and the first snapshot property to be used to hydrate the first storage volume;
        create the first storage volume using the one or more parameters specified by the storage volume creation request;
        cause the one or more prioritized blocks to be loaded onto the first storage volume according to the block load order indicated by the first snapshot property, wherein the one or more prioritized blocks include a first block having a location within the snapshot that is preceded by a second block of the plurality of blocks that has not yet been loaded onto the first storage volume;
        prior to loading the second block onto the first storage volume, receive a block read request to read the first block from the first storage volume; and
        return the first block without having to fetch the first block from the snapshot repository.

2. The system of claim 1, wherein the public snapshot server is further configured to cause remaining blocks of the plurality of blocks in the snapshot to be loaded onto the first storage volume based on an indication in the first snapshot property that the remaining blocks should be loaded.

3. The system of claim 2, wherein the public snapshot server is further configured to cause the remaining blocks to be loaded onto the first storage volume in a sequential order.

4. The system of claim 1, wherein the public snapshot server is further configured to refrain from causing remaining blocks of the plurality of blocks in the snapshot to be loaded onto the first storage volume based on an indication in the first snapshot property that the remaining blocks should not be loaded.

5. The system of claim 1, wherein the first snapshot property includes an ordered list of the one or more prioritized blocks, and a flag indicative of whether any blocks of the first snapshot not included in the ordered list should be loaded onto the first storage volume.

6. The system of claim 1, wherein the public snapshot server is further configured to receive another snapshot property association request to create an association between the first snapshot stored in the snapshot repository and a second snapshot property different from the first snapshot property, wherein the second snapshot property indicates another block load order different from the block load order indicated by the first snapshot property.

7. A computer-implemented method, comprising:
receiving a request to create a first storage volume from a first snapshot stored in a storage device, wherein the first snapshot includes a plurality of blocks, and wherein the request specifies one or more parameters usable to create the first storage volume;
creating the first storage volume using the one or more parameters specified by the request;
determining that the first snapshot is associated with a first snapshot property indicating a block load order in which one or more blocks of the plurality of blocks in the first snapshot are to be loaded onto the first storage volume;
loading the one or more blocks onto the first storage volume according to the block load order indicated by the first snapshot property, wherein the one or more blocks include a first block having a location within the snapshot that is preceded by a second block of the plurality of blocks that has not yet been loaded onto the first storage volume;
prior to loading the second block onto the first storage volume, receiving a request to read the first block from the first storage volume; and
returning the first block without having to fetch the first block from the storage device.

8. The computer-implemented method of claim 7, further comprising:
receiving a request to create an association between the first snapshot and one or more additional snapshot properties; and
storing the association between the first snapshot and the one or more additional snapshot properties.

9. The computer-implemented method of claim 7, further comprising, subsequent to loading the one or more blocks onto the first storage volume according to the block load order indicated by the first snapshot property, loading one or more additional blocks onto the first storage volume according to another block order indicated by a second snapshot property.

10. The computer-implemented method of claim 9, further comprising:
receiving a request for a list of snapshot properties associated with the first snapshot; and
outputting the list of snapshot properties associated with the first snapshot, wherein the list includes at least the first snapshot property.

11. The computer-implemented method of claim 7, further comprising refraining from loading remaining blocks of the plurality of blocks in the snapshot onto the first storage volume based on an indication in the first snapshot property that the remaining blocks should not be loaded.

12. The computer-implemented method of claim 7, wherein the first snapshot property includes an ordered list of the one or more blocks, and a flag indicative of whether any blocks of the first snapshot not included in the ordered list should be loaded onto the first storage volume.

13. The computer-implemented method of claim 7, wherein the first storage volume is associated with a total amount of I/O resources, the computer-implemented method further comprising:
allocating a first amount of I/O resources of the total amount of I/O resources to a user associated with the first storage volume;
allocating a second amount of I/O resources of the total amount of I/O resources to background operations; and
loading the one or more blocks onto the first storage volume using I/O resources from the second amount of I/O resources allocated to background operations.

14. The computer-implemented method of claim 13, further comprising:
prior to loading the second block onto the first storage volume, receiving a request to read the second block from the first storage volume; and
returning the second block after loading the second block from the storage device onto the first storage volume using I/O resources from the first amount of I/O resources.

15. A non-transitory computer-readable medium storing instructions that, when executed by a computing system, cause the computing system to perform operations comprising:
receiving a request to create a first storage volume from a first snapshot stored in a storage device, wherein the first snapshot includes a plurality of blocks, and wherein the request specifies one or more parameters usable to create the first storage volume;
creating the first storage volume using the one or more parameters specified by the request;
determining that the first snapshot is associated with a first snapshot property indicating a block load order in which one or more blocks of the plurality of blocks in the first snapshot are to be loaded onto the first storage volume;
loading the one or more blocks onto the first storage volume according to the block load order indicated by the first snapshot property, wherein the one or more blocks include a first block having a location within the snapshot that is preceded by a second block of the plurality of blocks that has not yet been loaded onto the first storage volume;
prior to loading the second block onto the first storage volume, receiving a request to read the first block from the first storage volume; and
returning the first block without having to fetch the first block from the storage device.

16. The non-transitory computer-readable medium of claim 15, wherein the operations further comprise loading remaining blocks of the plurality of blocks in the snapshot onto the first storage volume based on an indication in the first snapshot property that the remaining blocks should be loaded.

17. The non-transitory computer-readable medium of claim 15, wherein the operations further comprise refraining from loading remaining blocks of the plurality of blocks in the snapshot onto the first storage volume based on an indication in the first snapshot property that the remaining blocks should not be loaded.

18. The non-transitory computer-readable medium of claim 15, wherein the first snapshot property includes an ordered list of the one or more blocks, and a flag indicative of whether any blocks of the first snapshot not included in the ordered list should be loaded onto the first storage volume.

19. The non-transitory computer-readable medium of claim 15, wherein the first storage volume is associated with a total amount of I/O resources, the operations further comprising:
   allocating a first amount of I/O resources of the total amount of I/O resources to a user associated with the first storage volume;
   allocating a second amount of I/O resources of the total amount of I/O resources to background operations; and
   loading the one or more blocks onto the first storage volume using I/O resources from the second amount of I/O resources allocated to background operations.

20. The non-transitory computer-readable medium of claim 19, wherein the operations further comprise:
   prior to loading the second block onto the first storage volume, receiving a request to read the second block from the first storage volume; and
   returning the second block after loading the second block from the storage device onto the first storage volume using I/O resources from the first amount of I/O resources.

\* \* \* \* \*